Feb. 2, 1937.  B. G. CARLSON  2,069,214
SAFETY DEVICE FOR AIRPLANE AUTOMATIC PILOTS
Filed Nov. 2, 1934  2 Sheets-Sheet 1
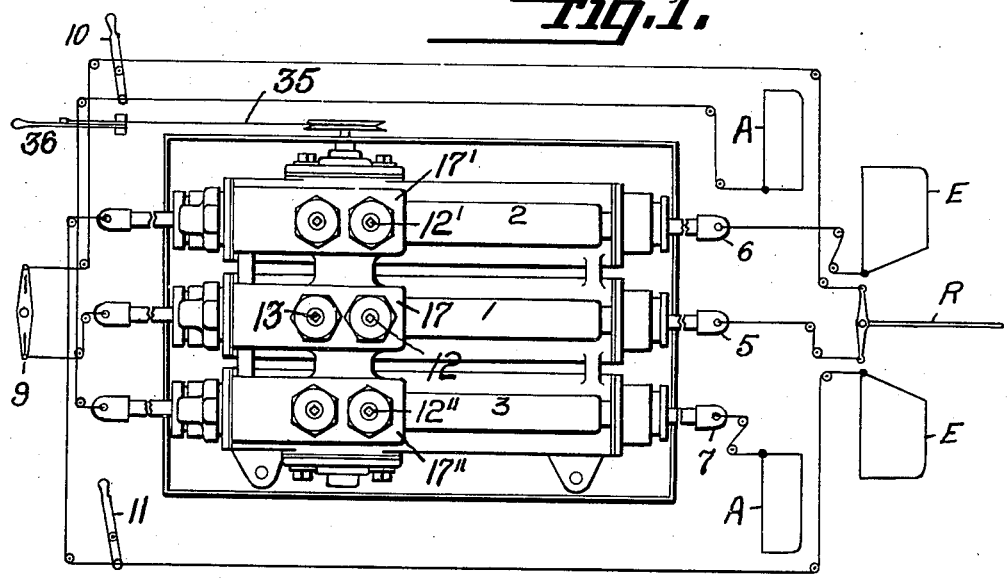
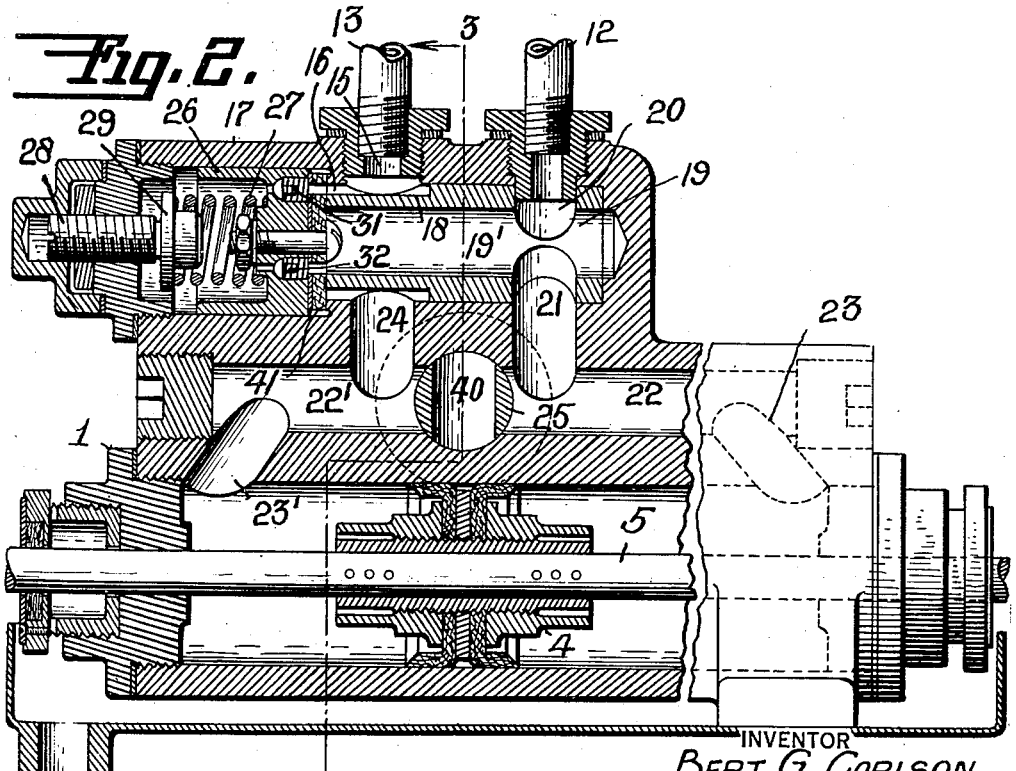
INVENTOR
BERT G. CARLSON
BY
Herbert H. Thompson
HIS ATTORNEY.

Feb. 2, 1937.  B. G. CARLSON  2,069,214
SAFETY DEVICE FOR AIRPLANE AUTOMATIC PILOTS
Filed Nov. 2, 1934  2 Sheets-Sheet 2
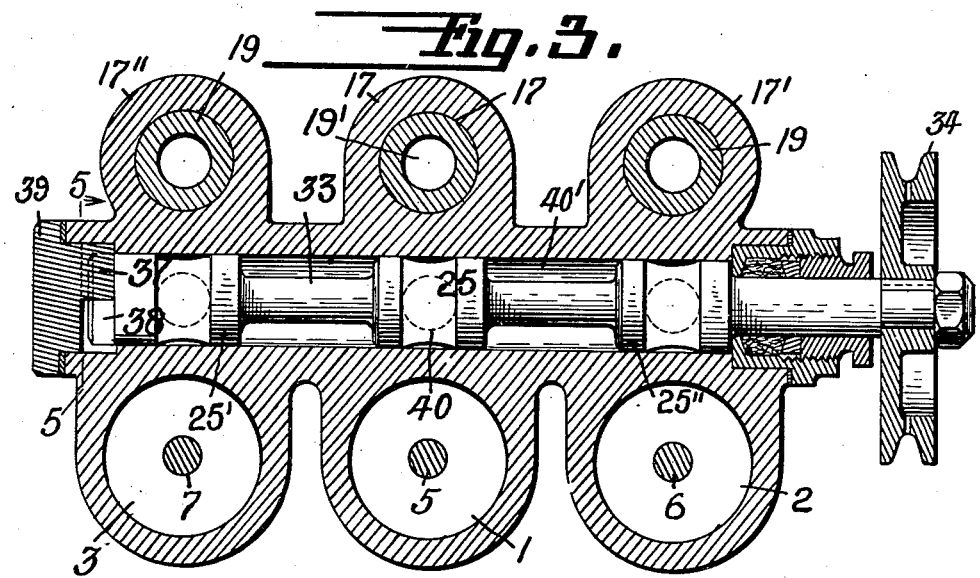
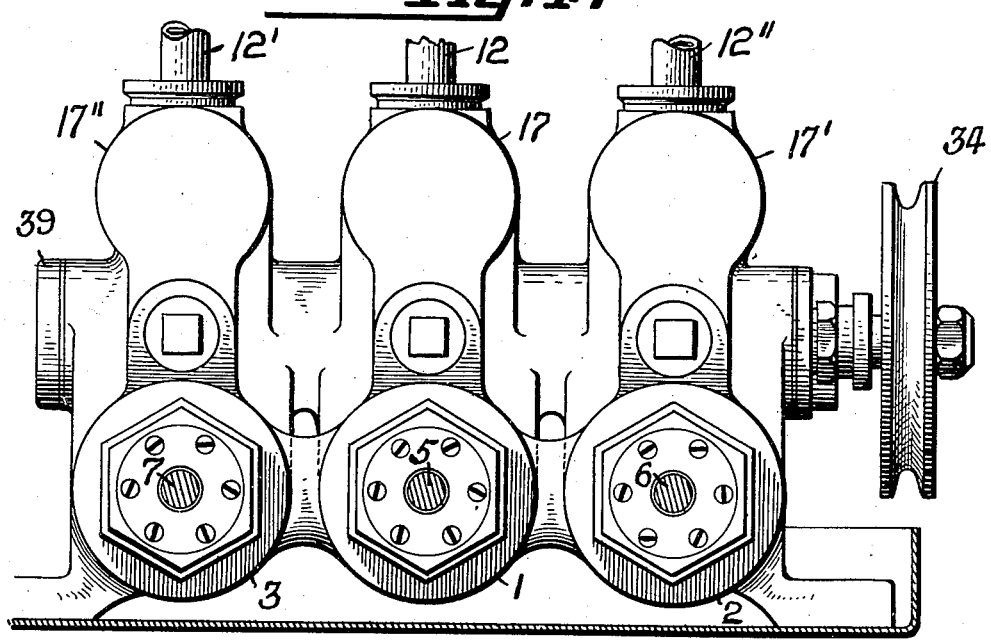
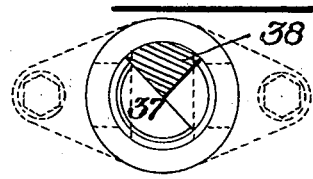
INVENTOR
BERT G. CARLSON
BY
Herbert H. Thompson
HIS ATTORNEY.

Patented Feb. 2, 1937

2,069,214

UNITED STATES PATENT OFFICE 2,069,214

SAFETY DEVICE FOR AIRPLANE AUTOMATIC PILOTS

Bert G. Carlson, Queens Village, N. Y., assignor to Sperry Gyroscope Company, Inc., Brooklyn, N. Y., a corporation of New York Application November 2, 1934, Serial No. 751,143

7 Claims. (Cl. 244—29)

This invention relates to servo motors for actuating the control surfaces of dirigible vehicles and especially of air-planes, with especial application to servo motors of automatic pilots. By means of my invention the human pilot can assume instant control of the aircraft at any time, regardless of the position, condition or complete breakdown of the pilot or servo motor system.

Referring to the drawings showing a preferred form of my invention,

Fig. 1 is a plan view of a servo motor unit, illustrating diagrammatically the connection thereof to the control surfaces and to the manual operating means.

Fig. 2 is a partial vertical section, on a larger scale, through one of the servo motor cylinders and control valves.

Fig. 3 is a transverse section taken approximately on line 3—3 of Fig. 2.

Fig. 4 is an end view of the unit.

Fig. 5 is a detail of the stop device on the by-pass valve.

The invention is shown as applied to the form of hydraulic servo motor disposed in applicant's copending application joint with Elmer A. Sperry, Jr. and Mortimer F. Bates, now Patent #1,992,970, dated March 5, 1935, for Hydro-pneumatic automatic pilot. According to this system, hydraulic servo motor cylinders 1, 2 and 3 are provided, one for each of the three controls, i. e., rudder R, elevators E and ailerons A, and each cylinder is controlled from a master valve (not shown) controlling the flow of oil to one side or the other of the several pistons 4, the master valve, in turn, being controlled from the pneumatically operated differential pressure means controlled by the gyroscopic control unit. The several control surfaces are shown as actuated from the several pistons by means of wires running therefrom to both of the opposite ends of the several piston rods 5, 6 and 7. Preferably the same wires lead to the several hand control levers or pedals by which the pilot controls the surfaces when the automatic pilot is not working. As shown, the wire from the rudder R is also connected to the foot pedals or other steering device 9. A wire from the ailerons also leads to the banking control handle 10 and a wire from the elevators also leads to the climb and dive control handle 11.

Referring to Fig. 2, the pipes 12 and 13 lead to the master control valve for one of the cylinders, for instance cylinder 1, the oil (or other liquid) pressure being supplied through one pipe when the rudder is to be turned in one direction, and returning through the other piper, and vice versa when a turn in the other direction is desired. The oil from the pipe 13 enters (or leaves) through port 15 into annular chamber 16 formed between the interior wall of the outer casing 17 and the reduced end 18 of a sleeve 19. Oil from the other pipe 12 passes through an opening 20 to the interior of said sleeve and normally passes out again through the port 21 into the channel 22 leading through port 23 into one end of the cylinder 1. Similarly, oil in the channel 15, if under pressure, will flow through port 24 into channel 22' and through port 23' into the other end of the cylinder, the two channels 22 and 22' being normally separated by the closed cylinder by-pass valve 25.

Normally closing the interior 19' of the sleeve 19 and also closing one end of the channel 16 around the exterior of said sleeve, is a safety piston or valve 26 normally held on its double seat on the end of sleeve 19 and on annular face 41 on the interior of housing 17, by a spring 27. Said spring is shown as adjustable as to tension by means of set screw 28, against a collar 29 of which the left hand end of said spring bears. Preferably the effective areas of the piston or valve face exposed to the pressures within the chamber 19' and within the chamber 15 are made equal, so that the piston will open under the same pressure, whether it be supplied through pipe 12 or pipe 13. When the piston opens due to excessive oil pressure, it will be seen that a bypass is provided so that the oil from the high pressure side may flow to the low pressure side directly and without moving the piston 4. Preferably small relief valves, as shown in the base of the piston 26, prevent any oil which leaks past the piston from building up a back pressure. Said relief valves are shown at 31 and 32, the latter being in communication with the chamber 19' and the former with the chamber 15 and operating to open in case the back pressure builds up higher than the pressure on the front thereof. A safety piston similar to 26 is of course provided for the other cylinders 2 and 3 within housings 17' and 17".

As an additional safety device I also provide a means for opening at will the cylinder or by-pass valve 25, which has a transverse bore 40 therethrough. Said valve is shown as mounted in a common stem 33 with the corresponding by-pass valves 25' and 25" for the other two cylinders 2 and 3 (see Fig. 3); and on said stem is shown a pulley 34, or other device for turning the same by hand. Said pulley may be operated by means of a wire 35 leading to a control handle 36 adjacent the aviator. A stop segment 37 is shown on the rear of said stem 33 (see Fig. 5), which strikes against a fixed stop pin or quadrant 38 on a closure 39 for the chamber 40', within which said valves are mounted.

The operation of my device is as follows: When under control of the automatic pilot, the several servo motors operate the several control surfaces by the displacement of the pistons 4 within the cylinders 1, 2 and 3. In case a pilot desires to cut out the automatic control, he rotates the handle 36 to rotate the bypass valves on stem 33 to bypass the oil pressure. Under these conditions the manual movement of any one of the control handles will move the rudders through the same wires, the pistons moving with the rudders unopposed by oil pressure. This constitutes the normal means for operating manually during landing and take-off. If, however, this throw-out means fails, or for any reason the pilot cannot disconnect the automatic control, he may still control the airplane by hand in any plane by exerting a greater force than normal on the proper control foot pedals 9, or handles 10 and 11. This unusual pressure will be transmitted to the oil through the piston 4 and will cause the piston 26 to open in the line affected, thus allowing the oil to bypass and permitting the control surface to be operated. By this means the hydraulic servo motor system cannot lock the controls and prevent them from being operated by the aviator at any time.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a safety device for hydraulic servo motors for aircraft having an operating cylinder and piston, a rudder operated thereby and alternative hand means for operating said rudder, means for supplying liquid under pressure to either side of said piston, a safety piston at said operating cylinder having a pressure face exposed to said liquid pressure regardless of which side of the main piston the pressure is applied to, a loading spring for said safety piston, and a safety bypass for the liquid from the high to the return side opened by movement of said safety piston against said spring, said safety bypass being independent of the operation of said liquid supplying means.

2. In a safety device for hydraulic servo motors for aircraft and the like, separate passages for leading the liquid to and from the motor in either direction, a bypass valve therebetween, comprising a sleeve, the interior of which is exposed to the liquid pressure in one passage and the exterior to the liquid pressure in the other passage, a valve face normally seating on the end of said sleeve, the area thereof exposed to the liquid within and without said sleeve being the same, and spring means for yieldingly holding said valve closed except when subject to more than normal pressure.

3. In a safety device for hydraulic servo motors for aircraft having an operating cylinder and piston, a rudder operated thereby and alternative hand means for operating said rudder, means for supplying liquid under pressure to move the piston in either direction, said operating cylinder having a bypass passage associated therewith between the high and the return side of the liquid supply, a loaded safety valve operating independently of said liquid supply means for closing said bypass passage and having its face simultaneously subjected to pressures existing on both sides of the operating cylinder piston and adapted to open when the pressure of the liquid on either side of the cylinder piston exceeds the normal working pressure, whereby the pilot may turn the rudder by over-controlling the servo motor.

4. In a safety device for hydraulic servo motors for aircraft and the like, separate passages for leading the liquid to and from the motor in either direction, a bypass valve therebetween, comprising a sleeve, the interior of which is exposed to the liquid pressure in one passage and the exterior to the liquid pressure in the other passage, a valve face normally seating on the end of said sleeve, the area thereof exposed to the liquid within and without said sleeve being the same, relief valves in said face for preventing the building up of back pressure, and spring means for yieldingly holding said valve closed except when subject to more than normal pressure.

5. In a semi-automatic control system for aircraft, a hydraulic servo motor for each control rudder, alternative manual control means for each rudder, means whereby pressure fluid is supplied to move each motor in either direction, and a pressure responsive safety valve for each motor having its pressure face subjected at all times to the pressures existing on both sides of its respective servo-motor piston to permit any rudder to be manually operated by overcontrolling its motor, regardless of the operation of said fluid supply means.

6. In a safety device for hydraulic servo motors for aircraft having an operating cylinder and piston, a rudder operated thereby and alternative hand means for operating said rudder, a pair of passages for supplying liquid under pressure and returning the same to move the piston in either direction, said operating cylinder having a bypass passage between the two ends of the cylinder, and a loaded safety valve for normally closing said bypass passage, having an operating surface exposed to the oil pressure in each end of said cylinder and adapted to bypass the liquid from one side of the piston to the other when the pressure of the liquid within either end of the cylinder exceeds the normal working pressure, whereby the pilot may turn the rudder by over-controlling the servo motor.

7. A safety bypass for hydraulic servo motors for aircraft, as claimed in claim 6, wherein the valve device is formed by a spring loaded single valve normally closing two openings of equal area which are connected to bypass the liquid between the two ends of the cylinder when the valve is opened.

BERT G. CARLSON.